Patented Dec. 19, 1950

2,534,813

UNITED STATES PATENT OFFICE 2,534,813

8-HALOXANTHINE SALTS OF CYCLIC-AMINOALKYL BENZOHYDRYL ETHERS AND THE PRODUCTION THEREOF

John W. Cusic, Skokie, Ill., assignor to G. D. Searle & Co., Chicago, Ill., a corporation of Illinois No Drawing. Application January 21, 1950, Serial No. 139,970

12 Claims. (Cl. 260—253)

This invention relates to haloxanthine compounds of diarylalkyl ethers of aminoalkanols and to the production thereof. More particularly this invention relates to 8-haloxanthine salts of organic bases having the following general structural formula

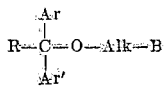

wherein Ar and Ar' are aryl radicals, R is a lower alkyl radical or a hydrogen atom, Alk is a lower alkylene radical, and B is an aliphatic-type organic amino radical.

This application is a continuation-in-part of my copending application Serial No. 82,284, filed March 18, 1949, now U. S. Patent No. 2,499,058, granted February 28, 1950.

In the foregoing structural formula Ar and Ar' represent lower aryl radicals which may be the same or different. Among such radicals are phenyl, tolyl, chlorophenyl, bromophenyl, iodophenyl, methoxyphenyl, ethoxyphenyl, xylyl, and similar aryl radicals of the benzene series. R represents hydrogen or a lower alkyl radical such as methyl or ethyl. Alk represents lower alkylene radicals such as ethylene, propylene, or the butylene radicals, and polymethylene radicals such as trimethylene and tetramethylene. The amino radical B represents aliphatic-type amino radicals, such as mono- and di(lower alkyl)amino radicals, wherein the lower alkyl radicals may be the same or different and the corresponding mono- and di(hydroxyalkyl) amino radicals containing one or two hydroxyl groups. As used herein, "lower alkyl" means a primary or secondary alkyl radical containing 1 to 5 carbon atoms. B also may represent cyclic amino radicals and saturated heterocyclic amino radicals which are aliphatic in character. It includes amino groups such as cyclohexylamino, cyclopentylamino, morpholino, piperidino, thiamorpholino, and alkyl derivatives of such amino radicals. B therefore represents a non-aromatic amino radical derived from an organic amine having dissociation constant in the range of $1 \times 10^{-3}$ to $1 \times 10^{-5}$.

It is widely recognized that diarylalkyl ethers of aminoalkanols elicit certain undesirable side reactions and toxic manifestations. The most common effects are dizziness and sleepiness following the administration of the medication. In certain cases there may be nausea and vomiting. Other effects which have been noticed include weakness, narcolepsy, indigestion, coldness of the extremities, exhaustion, irritability, blurred vision, confusion, and in rare instances collapse. The symptoms produced by diarylalkyl ethers of aminoalkanols are often severe enough to warrant reduced dosage or discontinuance of the medication.

It is the object of this invention to produce therapeutic compositions of matter which are relatively free from untoward reactions. A further object is to produce compositions of diarylalkyl ethers of aminoalkanols and haloxanthines of reduced toxicity. Another object is to produce compositions having enhanced therapeutic efficacy. Other objects will be apparent to those skilled in the art, in view of the disclosure given herein.

I have discovered that salts of diarylalkyl ethers of aminoalkanols with haloxanthines produce little effect on the central nervous system and are therapeutically more useful than any of the individual components alone. The salts of diarylalkyl ethers of aminoalkanols and haloxanthines exert a potentiating effect and show enhanced activity in combatting the effects of histamine. As such they are especially useful in the treatment of anaphylaxis and of allergic disorders.

Certain of the compositions within the scope of my invention are so free from undesirable side effects that they may actually be used in suppressing those undesirable symptoms commonly elicited by the usual antihistaminic drugs. For instance, my compounds can be used to prevent or alleviate nausea, motion sickness, dizziness and other distressing reactions.

Among the halogenated xanthines to which this invention pertains are the chloro, bromo, and iodo derivatives of theophylline and related xanthines which have a hydrogen atom in position 7. In particular this invention is concerned with acidic xanthines such as 8-chlorotheophylline
8-bromotheophylline
8-chloroxanthine
3-methyl-8-chloroxanthine
8-bromoxanthine
3-methyl-8-bromoxanthine
1,3-diethyl-8-bromoxanthine
1,3-diethyl-8-chloroxanthine
8-iodotheophylline
8-iodo-1,3-diethylxanthine Compositions of organic bases and haloxanthines are readily prepared by dissolving the base in a suitable solvent and treating the resulting solution with a solution of a halogenated xanthine. Solvents which are satisfactory for this reaction include the lower alcohols and ketones and their mixtures with water, ethers and hydrocarbons. Generally small excesses of the organic bases are desirable in these synthetic procedures. The desired salt generally crystallizes out of the solution on chilling or standing, or may be precipitated by addition of a solvent such as ether or benzene. A simple and efficient alternative method is that of heating together at 50–100° C. equivalent amounts of the liquid organic base and of the haloxanthine, with good mixing with a small amount of water or alcohol. As the materials react the mixture generally forms a thick paste or granular solid. On chilling the product becomes hard and solid and may be broken up, ground to a powder and dried. The compounds of this invention can also be produced by refluxing a solution of an ammonium salt of a haloxanthine in a lower alcohol or ketone with an equivalent of the organic base. During the heating, ammonia is evolved and the haloxanthine salt of the organic base is formed. On chilling this salt precipitates.

The following examples illustrate in more detail my invention, but in no way are to be construed as limiting it in spirit or in scope.

Example 1

A mixture of 30 g. of β-morpholinoethyl benzohydryl ether and 21.5 g. of 8-chlorotheophylline is agitated with 100 cc. of boiling methyl ethyl ketone containing 10 cc. of water. The resulting hot solution is treated with activated charcoal, filtered hot and evaporated to approximately one half its volume. The solution is then chilled and diluted with ether. The precipitate of the 8-chlorotheophylline salt of β-morpholinoethyl benzohydryl ether is removed and dried. A sample on analysis showed 6.59% chlorine. The calculated value is 6.73%.

Example 2

29.5 g. of β-morpholinoethyl benzohydryl ether and 26 g. of 8-bromotheophylline are dissolved in a boiling mixture of 100 cc. of methyl ethyl ketone and 15 cc. of water. The boiling solution is filtered and evaporated under vacuum on the steam bath. The residue of the 8-bromotheophylline salt of β-morpholinoethyl benzohydryl ether is triturated with ether, removed and dried. A sample on analysis showed 14.19% bromine. The theoretical value is 14.41%.

Example 3

A mixture of 15 g. of β-piperidinoethyl benzohydryl ether and 10.5 g. of 8-chlorotheophylline is agitated in a boiling solution of 55 cc. of methyl ethyl ketone and 10 cc. of water until dissolved. The hot solution is filtered to remove traces of undissolved 8-chlorotheophylline, then evaporated under vacuum. There is obtained a residue of the 8-chlorotheophylline salt of β-piperidinoethyl benzohydryl ether. A sample on analysis showed 6.85% chlorine. The calculated value is 6.96%.

Example 4

A solution of 98.6 g. of β-chloroethyl benzohydryl ether and 99 g. of cyclohexylamine in 200 cc. of butanone containing 5 g. of potassium iodide is refluxed for 3–4 days. The mixture is added to about 500 cc. of water, and the resulting mixture is made alkaline and extracted with ether. The ether extract is dried and evaporated. The residue of β-cyclohexylaminoethyl benzohydryl ether distills at 170–175° C. at 1.5 mm. pressure.

6 g. of the foregoing ether and 4 g. of 8-chlorotheophylline are dissolved in the minimum amount of hot butanone (100 cc. of butanone diluted with 4 cc. of water). The hot solution is filtered and allowed to cool slowly. There are deposited crystals of the 8-chlorotheophylline salt of β-cyclohexylaminoethyl benzohydryl ether. These are removed, washed with cold butanone and dried. A sample on analysis showed 6.41% chlorine. The calculated value is 6.58%.

Example 5

21 g. of benzohydryl β-(N-β-hydroxyethylmethylamino)ethyl ether and 20 g. of 8-chlorotheophylline are dissolved in the minimum amount of warm aqueous methyl ethyl ketone and filtered. The filtrate is chilled and crystals of the 8-chlorotheophylline salt of benzohydryl β-(N-β-hydroxyethyl-methylamino)ethyl ether separate. These are removed and dried, and melt at 225–230° C.

Example 6

A hot solution of 23.2 g. of ammonium 8-chorotheophyllinate and 25.5 g. of β-dimethylaminoethyl benzohydryl ether in 95 cc. of isopropanol and 10 cc. of water is refluxed for 4 hours. On chilling the salt precipitates. This is removed by filtration, washed with ether and dried. The 8-chlorotheophylline salt of β-dimethylaminoethyl benzohydryl ether so prepared melts at 102–104° C. After recrystallization from ethyl acetate it melts at 104–105° C.

I claim:

1. A salt of a basic ether of the formula

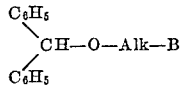

with an 8-haloxanthine containing a hydrogen atom in the 7-position, wherein Alk is a lower alkylene radical and B is an amino radical selected from the class consisting of morpholino, piperidino, cyclopentylamino, and cyclohexylamino radicals and lower alkyl derivatives thereof.

2. A salt of a morpholinoethyl benzohydryl ether with an 8-haloxanthine having a hydrogen atom in position 7.

3. A salt of β-morpholinoethyl benzohydryl ether with an 8-halotheophylline.

4. The 8-chlorotheophylline salt of β-morpholinoethyl benzohydryl ether.

5. The 8-bromotheophylline salt of β-morpholinoethyl benzohydryl ether.

6. The process of claim 7 wherein the solvent is methyl ethyl ketone.

7. The process of producing a salt of a basic ether and an 8-haloxanthine containing a hydrogen atom in the 7-position, said basic ether having the formula

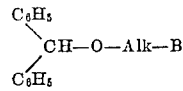

wherein Alk is a lower alkylene radical and B is an amino radical selected from the class consisting of morpholino, piperidino, cyclopentylamino, and cyclohexylamino radicals and lower alkyl derivatives thereof, which comprises mixing a member of the group consisting of an 8-haloxanthine which contains a hydrogen atom in the 7-position and the ammonium salt thereof, with said basic ether, dissolving the mixture in an inert water-soluble organic solvent at elevated temperature and separating the salt thus formed.

8. The process of producing the 8-chlorotheophylline salt of β-morpholinoethyl benzohydryl ether which comprises heating a mixture of 8-chlorotheophylline and β-morpholinoethyl benzohydryl ether in methyl ethyl ketone and separating the salt thus formed.

9. A salt of piperidinoethyl benzohydryl ether with an 8-haloxanthine having a hydrogen atom in position 7.

10. The 8-chlorotheophylline salt of β-piperidinoethyl benzohydryl ether.

11. A salt of β-cyclohexylaminoethyl benzohydryl ether with an 8-haloxanthine having a hydrogen atom in position 7.

12. The 8-chlorotheophylline salt of β-cyclohexylaminoethyl benzohydryl ether.

JOHN W. CUSIC.

No references cited.